US007912834B2

(12) United States Patent
Gupta et al.

(10) Patent No.: US 7,912,834 B2
(45) Date of Patent: Mar. 22, 2011

(54) REWRITE OF QUERIES CONTAINING RANK OR ROWNUMBER OR MIN/MAX AGGREGATE FUNCTIONS USING A MATERIALIZED VIEW

(75) Inventors: Abhinav Gupta, Palo Alto, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 255 days.

(21) Appl. No.: 11/437,072

(22) Filed: May 19, 2006

(65) Prior Publication Data

US 2006/0212436 A1 Sep. 21, 2006

Related U.S. Application Data

(62) Division of application No. 10/107,106, filed on Mar. 26, 2002, now Pat. No. 7,111,020.

(51) Int. Cl.
*G06F 17/30* (2006.01)

(52) U.S. Cl. .......................................................... 707/717

(58) Field of Classification Search .................. 707/2, 3, 707/4, 5, 201, 717, 713, 759, 714, E17.017, 707/E17.063, 999.002
See application file for complete search history.

(56) References Cited

U.S. PATENT DOCUMENTS 4,773,862 A 9/1988 Baba
5,261,098 A 11/1993 Katin et al.
5,276,870 A 1/1994 Shan et al.
5,404,506 A 4/1995 Fujisawa et al.
5,418,946 A 5/1995 Mori
5,444,842 A 8/1995 Bentson et al.
5,548,755 A 8/1996 Leung et al.
5,551,027 A 8/1996 Choy et al.
5,560,005 A 9/1996 Hoover et al.
5,581,758 A 12/1996 Burnett et al.
5,584,024 A 12/1996 Shwartz
5,594,899 A 1/1997 Knudsen et al.
5,598,559 A 1/1997 Chaudhuri
5,600,831 A 2/1997 Levy et al.
5,659,728 A 8/1997 Bhargava et al.
5,701,455 A 12/1997 Bhargava et al.
5,724,575 A 3/1998 Hoover et al.
5,729,730 A 3/1998 Wlaschin et al.
5,734,884 A 3/1998 Eberhard et al.
5,765,147 A * 6/1998 Mattos et al. ..................... 707/4
5,774,692 A 6/1998 Boyer et al.
5,778,353 A 7/1998 Schiefer et al.
5,778,355 A 7/1998 Boyer et al.
5,812,840 A 9/1998 Shwartz
5,822,751 A * 10/1998 Gray et al. ........................ 707/3
(Continued)

OTHER PUBLICATIONS

Gopalkrishnand, Vivikanand, et al., "Issues of Object-Relational View Design in Data Warehousing Environment", IEEE 1998, pp. 2732-2737.

(Continued)

*Primary Examiner* — Greta L Robinson
(74) *Attorney, Agent, or Firm* — Hickman Palermo Truong & Becker LLP

(57) ABSTRACT

Techniques are provided for improving efficiency of database systems, and in particular, to refreshing materialized views maintained by database systems and rewriting queries to access the materialized views. According to the approaches, a ranked materialized view is incrementally refreshed, and during the incremental refresh operation, rows in the partitions of the materialized view are ranked within the partitions.

6 Claims, 14 Drawing Sheets

U.S. PATENT DOCUMENTS

| | | | |
|---|---|---|---|
| 5,826,077 A | 10/1998 | Blakeley et al. | |
| 5,832,485 A | 11/1998 | Chaudhry | |
| 5,848,405 A | 12/1998 | Norcott | |
| 5,873,093 A | 2/1999 | Williamson et al. | |
| 5,875,447 A | 2/1999 | Goel et al. | |
| 5,897,632 A | 4/1999 | Dar et al. | |
| 5,950,210 A | 9/1999 | Nelson | |
| 5,956,706 A | 9/1999 | Carey et al. | |
| 5,960,426 A | 9/1999 | Pirahesh et al. | |
| 5,960,427 A | 9/1999 | Goel et al. | |
| 5,963,933 A | 10/1999 | Cheng et al. | |
| 5,963,959 A | 10/1999 | Sun et al. | |
| 5,970,482 A | 10/1999 | Pham et al. | |
| 5,974,407 A | 10/1999 | Sacks | |
| 5,974,416 A | 10/1999 | Anand et al. | |
| 5,978,788 A | 11/1999 | Castelli et al. | |
| 5,978,791 A | 11/1999 | Farber et al. | |
| 5,987,455 A | 11/1999 | Cochrane et al. | |
| 5,991,754 A | 11/1999 | Raitto et al. | |
| 6,003,022 A | 12/1999 | Eberhard et al. | |
| 6,006,216 A | 12/1999 | Griffin et al. | |
| 6,023,695 A | 2/2000 | Osborn et al. | |
| 6,026,390 A | 2/2000 | Ross et al. | |
| 6,032,144 A | 2/2000 | Srivastava et al. | |
| 6,088,705 A | 7/2000 | Lightstone et al. | |
| 6,108,651 A | 8/2000 | Guha | |
| 6,125,360 A | 9/2000 | Witkowski et al. | |
| 6,134,543 A | 10/2000 | Witkowski et al. | |
| 6,199,063 B1 | 3/2001 | Colby et al. | |
| 6,205,451 B1 | 3/2001 | Norcott et al. | |
| 6,272,502 B1 | 8/2001 | Lieuwen et al. | |
| 6,289,335 B1 | 9/2001 | Downing et al. | |
| 6,334,114 B1 | 12/2001 | Jacobs et al. | |
| 6,334,128 B1 | 12/2001 | Norcott et al. | |
| 6,339,769 B1 | 1/2002 | Chochrane et al. | |
| 6,356,889 B1 | 3/2002 | Lohman et al. | |
| 6,356,891 B1 | 3/2002 | Agrawal et al. | |
| 6,374,263 B1 | 4/2002 | Bunger et al. | |
| 6,457,020 B1 | 9/2002 | Carey et al. | |
| 6,473,201 B1 | 10/2002 | Sato | |
| 6,477,525 B1 | 11/2002 | Bello et al. | |
| 6,480,836 B1 | 11/2002 | Colby et al. | |
| 6,484,159 B1 * | 11/2002 | Mumick et al. | 1/1 |
| 6,493,699 B2 * | 12/2002 | Colby et al. | 707/2 |
| 6,493,701 B2 | 12/2002 | Ponnekanti | |
| 6,496,828 B1 | 12/2002 | Cochrane et al. | |
| 6,546,402 B1 | 4/2003 | Beyer et al. | |
| 6,560,476 B1 | 5/2003 | Pelletier et al. | |
| 6,629,094 B1 * | 9/2003 | Colby et al. | 707/4 |
| 6,741,997 B1 | 5/2004 | Liu et al. | |
| 6,748,392 B1 | 6/2004 | Galindo-Legaria et al. | |
| 6,763,352 B2 | 7/2004 | Cochrane et al. | |
| 6,882,993 B1 * | 4/2005 | Lawande et al. | 707/714 |
| 7,007,006 B2 | 2/2006 | Zilio et al. | |
| 7,111,020 B1 | 9/2006 | Gupta et al. | |
| 7,158,994 B1 | 1/2007 | Smith et al. | |
| 2001/0013030 A1 | 8/2001 | Colby et al. | |
| 2003/0093415 A1 * | 5/2003 | Larson et al. | 707/3 |
| 2003/0135480 A1 | 7/2003 | Van Arsdale et al. | |
| 2003/0159136 A1 | 8/2003 | Huang et al. | |
| 2003/0200218 A1 | 10/2003 | Tijare et al. | |
| 2004/0122828 A1 | 6/2004 | Sidle et al. | |
| 2005/0055382 A1 | 3/2005 | Ferrat et al. | |

OTHER PUBLICATIONS

Kung, Chenho, "Object Subclass Hierarchy in SQL: A Simple Approach", Communications of the ACM, Jul. 1990, vol. 33, No. 7, pp. 117-125.

Bello, Randall G., et al., "Materialized Views in Oracle", VLDB 1998, Proceedings of 24$^{th}$ International Conference on Very Large Databases, Aug. 24-27, 1998, pp. 659-664.

Najjar, Faiza, et al., "Cardinality estimation of distributed join queries", Database and Expert Systems Applications, Proceedings of the Tenth International Workshop, dated Sep. 1-3, 1999, pp. 66-70.

Moro, Gianluca, et al., "Incremental maintenance of multi-source views", Database Conference, 2001, ADC 2001, Proceedings, 12$^{th}$ Australasian, Jan. 2001, pp. 13-20.

Bhargava, Gautam et al., "Hypergraph based reorderings of outer join queries with complex predicates", Proceedings of the 1995 ACM SIGMOND International Conference on Management of Data and Symposium on Principles of Database Systems, May 22-25, 1995, pp. 304-315.

Bhagrava, Gautam et al., "Efficient processing of outer joins and aggregate junctions", Proceedings of the Twelfth International Conference Data Engineering, Feb. 26-Mar. 1, 1996, pp. 441-449.

Chaudhuri, Surajit et al., "Optimizing Queries with Materialized Views", Proceedings of the Eleventh International Conference on Data Engineering, Mar. 6-10, 1995, pp. 190-200.

Chen, Arbee L.P., "Outerjoin Optimization in Multidatabase Systems", Proceedings of the Second International Symposium on Databases in Parallel and Distributed Systems, 1990, Jul. 2-4 1990, pp. 211-218.

Gopalkrishnan, Vivekanand et al., "Issues of Object-Relational View in Data Warehousing Environment", 1998 IEEE International Conference on Systems, Man, and Cybernetics, Oct. 11-14, 1998, vol. 3, pp. 2732-2737.

http://www.research.att.com/conf/vldb98, Mar. 2001.

http://www.research.att.com/conf/vldb98/program.html, Mar. 2001.

Jajodia, Sushil et al., "Polyinstantiation integrity in multilevel relations"; May 7-9, 1990; Research in Security and Privacy, 1990, Proceedings, 1990 IEEE Computer Society Symposium on, pp. 104-115.

Kuno et al., Incremental Maintenance of Materialized Object-Oriented Views in MultiView: Strategies and Performance Evaluation, IEEE Transactions on Knowledge and Data Engineering, vol. 10, Issue 5, Sep.-Oct. 1998, pp. 768-792.

Kuno, Harumi A et al. (1996), Using Object-Oriented Principles to Optimize Update Propagation to Materialized Views, pp. 310-317.

Kuno, Harumi et al., "Augmented Inherited Multi-Index Structure for Maintenance of Materialized Path Query Views", Proceedings of the Sixth International Conference on Research Issues in Data Engineering, Feb. 26-27, 1996, pp. 128-137.

Lee, Byung Suk et al., "Outer joins and filters for instantiating objects from relational databases through views", IEEE Transactions on Knowledge and Data Engineering, Feb. 1994, vol. 6, Issue 1, pp. 108-119.

Ling, Tok Wang et al., "A model for evaluating materialized view maintenance algorithms", Web Information Systems Engineering, 2000, Proceedings of the First International Conference on, vol. 1, Jun. 2000, pp. 374-382.

Liu, Jixue et al., "Derivation of incremental for nested relations", Database Conference, 2001, ADC 2001, Proceedings, 12th Australasian, Jan. 2001, pp. 76-82.

Lo, Ming-Ling et al., "Spatial Hash-Joins", Proceedings of the 1996 ACM SIGMOND International Conference on Management of Data, 1996, pp. 247-258.

Marek, Robert et al., "TID Hash Joins", Proceedings of the third international conference in Information and knowledge management, 1994, No. 2-, Dec. 2, 1994, pp. 42-49.

Mensah, Kuassi, et al., Oracle Corporation, "Database Web Services," An Oracle White Paper, Nov. 2002, pp. 1-21.

Mishra, Priti et al., "Join Processing in Relational Databases", ACM Computing Surveys, vol. 24, No. 1, Mar. 1992, pp. 63-113.

Moro, Gianluca et al., "Incremental maintenance of multi-source views", Database Conference, 2001, ADC 2001, Proceedings, 12th Australasian, Jan. 2001, pp. 13-20.

Najjar, Faiza et al., "Cardinality estimation of distributed join queries"; Sep. 1-3, 1999; Database and Expert Systems Applications, 1999, Proceedings, Tenth International Workshop on, pp. 66-70.

O'Neil, Patrick et al., "Multi-Table Joins Through Bitmapped Join Indices", SIGMOND Record, vol. 24, No. 3, Sep. 1995, pp. 8-11.

Pang, HweeHwa et al., "Partially Preemptble Hash Joins", Proceedings of the 1993 ACM SIGMOND international conference on Management of data, 1993, pp. 59-68.

Proietti, Guido et al., "Analysis of range queries and self-spatial join queries on real region datasets stored using an R-tree"; Sep.-Oct. 2000; Knowledge and Data Engineering, IEEE Transaction, vol. 12, Issue 5, pp. 751-762.
Randall G. Bello et al., "Materialized Views in Oracle", VLDB '98, Proceedings of 24th International Conference on Very Large Data Bases, Aug. 24-27, 1998, New York City, New York, USA, pp. 659-664.
Rao, Jun et al., "Using EELs, a practical approach to outerjoin and antijoin reordering"; Apr. 2-6, 2001; Data Engineering, 2001, Proceedings, 17th International Conference on, 585-594.
Ross, Kenneth et al., "Materialized view maintenance and integrity constraint checking: trading space for time", Proceedings of the 1996 ACM SIGMOND international conference on Management of data, Jun. 3-6, 1996, pp. 447-458.
Scheurmann, Peter et al., "Query processing in multidatabase systems"; Oct. 18-21, 1992; Systems, Man and Cybernetifcs, 1992 IEEE International Conference on, vol. 2, pp. 1250-1254.
Schewe, Klaus-Dieter, "On the unification of query algebras and their extension to Rational Tree Structures"; Jan. 29-Feb. 2, 2001; Database Conference, 2001, ADC 2001, Proceedings, 12th Australasian, pp. 52-59.
Segev, Arie et al., "Maintaining Materialized Views in Distributed Databases", Proceedings of the Fifth International Conference on Data Engineering, Feb. 6-10, 1989, pp. 262-270.
Stocker, Conrad et al., "Integrating semi-join-reducers into state-of-the-art query processors"; Apr. 2-6, 2001; Data Engineering 2001, Proceedings 17th International Conference on, pp. 575-584.
Taniar et al., "Aggregate-join query processing in parallel database systems"; May 14-17, 2000; High Performance Computing in the Asia-Pacific Region, 2000, Proceedings, The Fourth International Conference/Exhibition on, vol. 2, pp. 824-829.
Weihrauch, Maryela , "DB2 for OS/390 V5 vs. V6 outer join performance3"; Apr. 24-25, 2000; Performance Analysis of Systems and Software, 2000, IEEE International Symposium on, pp. 46-51.
Yan, Weipeng et al., "Performing Group-By before Join", Proceedings of the $10^{th}$ International Conference on Data Engineering, Feb. 14-18, 1994, pp. 89-100.
"Oracle 9i Materialized Views" An Oracle White Paper (May 2001) 23 pages.
Mistry et al, "Materialized View Selection and Maintenance Using Multi-Query Optimization," IIT-Bombay Bell Labs Univ. of Massachusetts-Amherst (Jun. 2001).
Lane, Paul, et al., "Oracle9i Data Warehousing Guide (title pages)", Release 2 (9.2), Part No. A96520-01, retrieved from internet : http://download.oracle.com/docs/cd/B10501_01/server.920/a96520/title.html, Mar. 2002, 2 pages.
Lane, Paul, et al., "Oracle9i Data Warehousing Guide—Chapter 8, Materialized Views", Release 2 (9.2), Part No. A96520-01, retrieved from internet : http://download.oracle.com/docs/cd/B10501_01/server.920/a96520/mv.html, Mar. 2002, 41 pages.
Biggs, Maggie, "Oracle8 still in pole position", InfoWorld, Framingham; Dec. 15, 1997, vol. 19, Issue 50, p. 1, 97, ISSN: 01996649.
U.S. Appl. No. 11/084,331, filed Mar. 18, 2005, Final Office Action, May 25, 2010.
Al-Anzi, Fawas S. et al., "Modeling behavior, a Step Towards Defining Functionally Correct Views of Complex Objects in Concurrent Engineering", CIKM '94. Gaitherburg MD, USA, 1994 ACM 089791-674-3, pp. 1-9.
Gopalkrishnand, Vivikanand, et al. "Issues of Object-Relational View Design in Data Warehousing Environment," IEEE 1998, 0780347781, pp. 2732-2737.
Kung, Chenho, "Object Subclass Hierarchy in SQL: A Simple Approach," Communications of the ACM, Jul. 1990, vol. 33, No. 7, pp. 117-125.
Liu, Jixue et al., "Incremental maintenance of Nested Relational Views," School of Computer and Information Science, The University of South Australia, pp. 197-205, 2001.

* cited by examiner

Table T

110

| rowid 111 | region 112 | sales_person 113 | sales 114 |
|---|---|---|---|
| R1 | W | P1 | 200 |
| R2 | W | P2 | 160 |
| R3 | W | P3 | 150 |
| R4 | W | P4 | 140 |
| R5 | W | P5 | 130 |
| R6 | W | P6 | 120 |
| R7 | W | P7 | 190 |
| R8 | W | P8 | 180 |
| R9 | W | P9 | 170 |
| R10 | W | P10 | 110 |
| R11 | W | P11 | 100 |
| R12 | W | P12 | 90 |
| R13 | W | P13 | 80 |
| R14 | W | P14 | 80 |
| R15 | E | P15 | 205 |
| R16 | E | P16 | 195 |
| R17 | E | P17 | 115 |
| R18 | E | P18 | 105 |
| R19 | E | P19 | 95 |
| R20 | E | P20 | 85 |
| R21 | E | P21 | 85 |
| R22 | E | P22 | 185 |
| R23 | E | P23 | 175 |
| R24 | E | P24 | 165 |
| R25 | E | P25 | 155 |
| R26 | E | P26 | 145 |
| R27 | E | P27 | 135 |
| R28 | E | P28 | 125 |

Rows 120

FIG. 1A

Materialized View M1

130

Rows 140

| rid (131) | region (132) | sales_person (133) | sales (134) | rnk (135) | |
|---|---|---|---|---|---|
| R1 | W | P1 | 200 | 1 | Partition 142 |
| R7 | W | P7 | 190 | 2 | |
| R8 | W | P8 | 180 | 3 | |
| R9 | W | P9 | 170 | 4 | |
| R2 | W | P2 | 160 | 5 | |
| R3 | W | P3 | 150 | 6 | |
| R15 | E | P15 | 205 | 1 | Partition 144 |
| R16 | E | P16 | 195 | 2 | |
| R22 | E | P22 | 185 | 3 | |
| R23 | E | P23 | 175 | 4 | |
| R24 | E | P24 | 165 | 5 | |
| R25 | E | P25 | 155 | 6 | |

FIG. 1B

Table T

110

| rowid (111) | region (112) | sales_person (113) | sales (114) | |
|---|---|---|---|---|
| ~~R1~~ | ~~W~~ | ~~P1~~ | ~~200~~ | DELETED |
| R2 | W | P2 | 160 | |
| ~~R3~~ | ~~W~~ | ~~P3~~ | ~~150~~ | DELETED |
| R4 | W | P4 | 140 | |
| R5 | W | P5 | 130 | |
| R6 | W | P6 | 120 | |
| R7 | W | P7 | 190 | |
| R8 | W | P8 | 180 | |
| R9 | W | P9 | 170 | |
| R10 | W | P10 | 110 | |
| R11 | W | P11 | 100 | |
| R12 | W | P12 | 90 | |
| R13 | W | P13 | 80 | |
| R14 | W | P14 | 80 | |
| R29 | W | P26 | 175 | INSERTED |
| R30 | W | P20 | 145 | INSERTED |
| R15 | E | P15 | 205 | |
| R16 | E | P16 | 195 | |
| R17 | E | P17 | 115 | |
| R18 | E | P18 | 105 | |
| R19 | E | P19 | 95 | |
| R20 | E | P20 | 85 | |
| R21 | E | P21 | 85 | |
| R22 | E | P22 | 185 | |
| R23 | E | P23 | 175 | |
| R24 | E | P24 | 165 | |
| R25 | E | P25 | 155 | |
| R26 | E | P26 | 145 | |
| R27 | E | P27 | 135 | |
| R28 | E | P28 | 125 | |

Rows 120

| 131 rid | 132 region | 133 sales_person | 134 sales | 135 rnk |
|---|---|---|---|---|
| ~~R1~~ | ~~W~~ | ~~P1~~ | ~~200~~ | ~~1~~ |
| R7 | W | P7 | 190 | 2 |
| R8 | W | P8 | 180 | 3 |
| R9 | W | P9 | 170 | 4 |
| R2 | W | P2 | 160 | 5 |
| ~~R3~~ | ~~W~~ | ~~P3~~ | ~~150~~ | ~~6~~ |

| 131 rid | 132 region | 133 sales_person | 134 sales | 135 rnk |
|---|---|---|---|---|
| R7 | W | P7 | 190 | 2 |
| R8 | W | P8 | 180 | 3 |
| R9 | W | P9 | 170 | 4 |
| R2 | W | P2 | 160 | 5 |
| R29 | W | P26 | 175 | "" |

| 131 rid | 132 region | 133 sales_person | 134 sales | 135 rnk |
|---|---|---|---|---|
| R7 | W | P7 | 190 | 1 |
| R8 | W | P8 | 180 | 2 |
| R9 | W | P9 | 170 | 4 |
| R2 | W | P2 | 160 | 5 |
| R29 | W | P26 | 175 | 3 |

FIG. 3D

RLog

| snaptime$$ (435) | oldnew (436) | rid (431) | region (432) | sales_person (433) | sales (434) |
|---|---|---|---|---|---|
| t1 | 'O' | R1 | W | P1 | 200 |
| t1 | 'N' | R1 | W | P1 | 100 |
| | | | | | |
| | | | | | |
| | | | | | |
| | | | | | |
| | | | | | |

411, 412 (rows), 440 (rows)

FIG. 4B-1

View vRlog

```
SELECT rid, region, sales_person, sales, oldnew
FROM RLog
WHERE snaptime$$ > :last_refresh_time and
          snaptime$$ <= :current_refresh_time;
```

FIG. 4B-2

BLog 472 474 476 478

464 462

| tableobj | timestamp | lowrowid | highrowid |
|---|---|---|---|
| objectid_T | t2 | R10000 | R20000 |
| | | | |
| | | | |
| | | | |
| | | | |
| | | | |
| | | | |

FIG. 4C-1 vBlog

```
SELECT T.rowid rid, region, sales_person, sales, 'N' oldnew
FROM BLog b, T
WHERE b.tableobj =:objid_of_T and
      b.timestamp >:last_refresh_time and
      b.timestamp <=:current_refresh_time and
      T.rowid between (b.lowrowid and b.highrowid);
```

FIG. 4C-2

QDelete

```
delete from M1
where (rid in (select rid      ← 522 predicate
               from VRLog
               where oldnew = 'O'))
   OR
   (rnk is NULL);              ← 524 predicate
```

521 (brace around the where clause)

QInsert

```
insert into M1(rid, region, sales_person, sales, rnk)
 select  rowid, region, sales_person, sales, NULL
 from T
 where
    rowid in (select rid
            from vRLog
            where oldnew = 'N'
            UNION ALL
            select rid
            from vBLog);
```

540

542 predicate

526 Inner Query

528 Inner Query

FIG. 5C

QUpdate

562 Inline View JV

564 Inline View V

```
update
 (
  select M1.rnk rnk, new_rnk
  from
   (select rid, region, sales,
        MIN(CASE WHEN rnk is NULL          } 576
          THEN NULL
          ELSE sales END)
            OVER  (PARTITION BY region) min_sales,
        RANK(sales) ---------------------------------- 578
            OVER (PARTITION BY region              } 582
                   ORDER BY sales DESC) new_rnk
    from M1
    where region in                        } 580 predicate
        (select region
         from vRLog
         UNION ALL
         select region
         from vBLog)
   ) V, M1
  where M1.rid = V.rid and
       sales >= min_sales and              } 572
       new_rnk <= r2
 ) JV SET rnk = new_rnk;
```

FIG. 5D

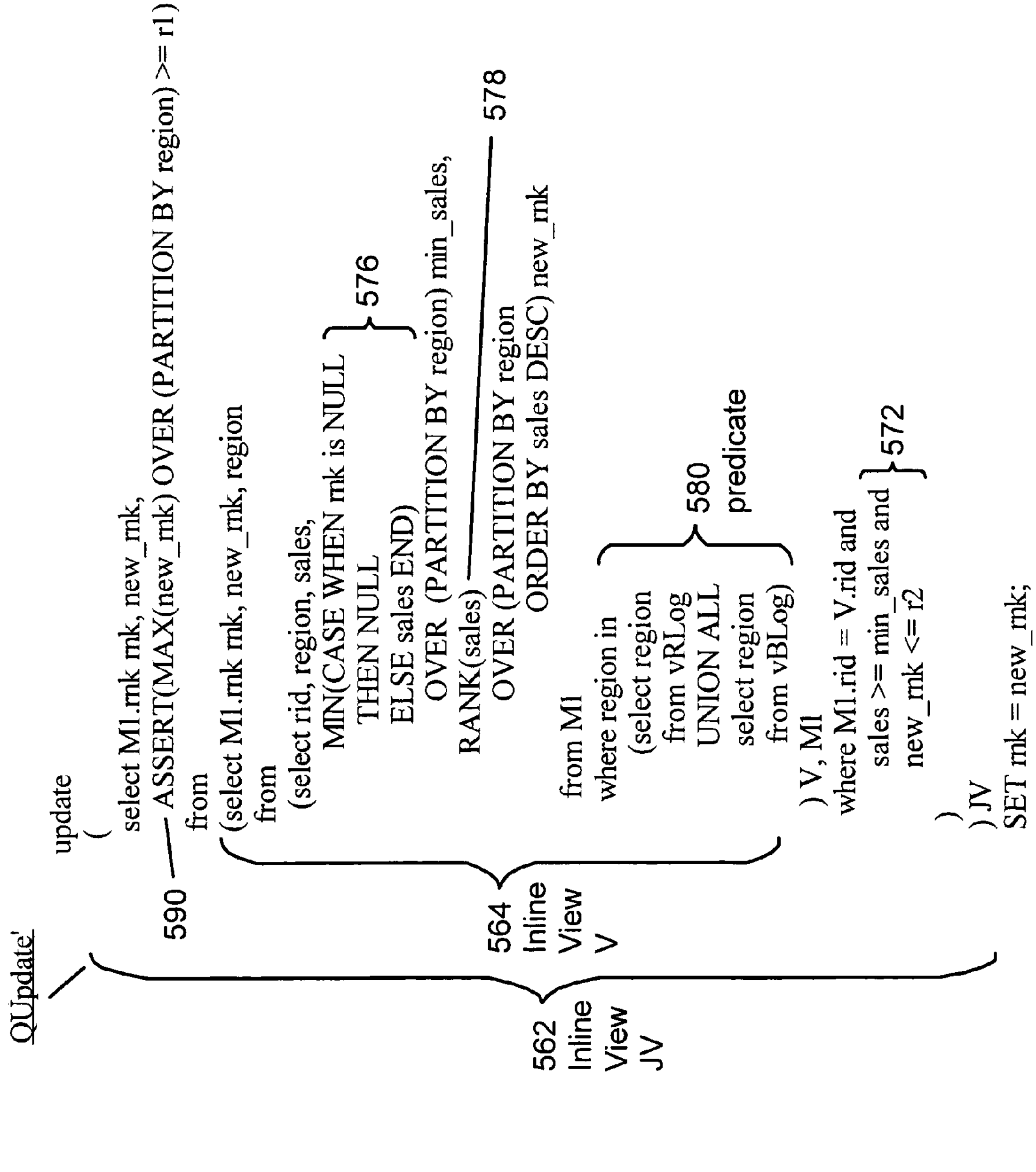

FIG. 5E

```
QUpdate' {
    update
    (
        select M1.rnk rnk, new_rnk,
    590 — ASSERT(MAX(new_rnk) OVER (PARTITION BY region) >= r1)
        from
        (select M1.rnk rnk, new_rnk, region
         from
         (select rid, region, sales,
            MIN(CASE WHEN rnk is NULL  ⎫
                 THEN NULL              ⎬ 576
                 ELSE sales END)        ⎭
              OVER (PARTITION BY region) min_sales,
            RANK(sales)
              OVER (PARTITION BY region
                    ORDER BY sales DESC) new_rnk ——— 578
          from M1
          where region in                    ⎫
              (select region                  ⎪
               from vRLog               580   ⎬
               UNION ALL              predicate⎪
               select region                   ⎪
               from vBLog)                     ⎭
         ) V, M1
         where M1.rid = V.rid and    ⎫
               sales >= min_sales and ⎬ 572
               new_rnk <= r2          ⎭
        }  564
        ) JV     Inline
                 View
                 V
    SET rnk = new_rnk;
}  562
   Inline
   View
   JV
```

REWRITE OF QUERIES CONTAINING RANK OR ROWNUMBER OR MIN/MAX AGGREGATE FUNCTIONS USING A MATERIALIZED VIEW

RELATED APPLICATION

This application is a divisional of and claims priority to U.S. patent application Ser. No. 10/107,106, entitled incremental Refresh of Materialized Views Containing Rank Function, and Rewrite of Queries Containing Rank or Rownumber or Min/Max Aggregate Functions Using Such A Materialized View, filed on Mar. 26, 2002 by Abhinav Gupta, et al., now U.S. Pat. No. 7,111,020 on Sep. 19, 2006, the contents of which are incorporated herein by reference.

This application is related to U.S. patent application Ser. No. 10/059,616, entitled Incremental Refresh of Materialized Views with Joins and Aggregates after Arbitrary DML Operations to Multiple Tables, filed by Shilpa Lawande, Abhinav Gupta, Benoit Dageville on Jan. 28, 2002, and issued as U.S. Pat. No. 6,882,993 on Apr. 9, 2005, herein referred to as Lawande and incorporated by reference.

FIELD OF THE INVENTION

The present invention relates to database systems, and in particular, to maintaining materialized views.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms “table”, “row” and “column” shall be used herein to refer respectively to the data container, record, and field.

In a database used for “data warehousing” or “decision support”, it is common for identical or closely related queries to be issued frequently. For example, a business may periodically generate reports that summarize the business facts stored in the database, such as: “What have been the best selling brands of soft drinks in each of our sales regions, during the past six months?”.

To respond to such queries, the database server typically has to perform numerous joins, aggregation and ranking operations. The join operations are performed because the database records that contain the information that is required to respond to the queries are often organized into a star schema. A star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as “fact tables”, while the smaller tables are referred to as “dimension tables”. The aggregation operations are performed to compute sum of sales and ranking to get the top selling brands.

When a database management system contains very large amounts of data, certain queries against the database can take an unacceptably long time to execute.

Materialized Views

Among commercial users of database systems, it has become a common practice to store the results of often-repeated queries in database tables or some other persistent database object. By storing the results of queries, the costly operations required to generate the results do not have to be performed every time the queries are issued. Rather, the database server responds to the queries by simply retrieving the pre-computed data.

These stored results are commonly referred to as materialized views. The contents of a materialized view is defined by metadata referred to as a view definition. The view definition contains mappings to one or more columns in the one or more tables containing the data. Typically, the view definition is in the form of a database query.

Columns and tables that are mapped to a materialized view are referred to herein as base columns and base tables of the materialized view, respectively. The column and the base column mapped to the column are referred to as being the same field. The data maintained in the base columns is referred to herein as base data. The data contained in a materialized view is referred to herein as materialized data.

Materialized views eliminate the overhead associated with gathering and deriving the data every time a query is executed. Computer database systems that are used for data warehousing frequently maintain materialized views that contain pre-computed summary information in order to speed up query processing. Such summary information is created by applying an aggregate function, such as SUM, COUNT, or AVERAGE, to values contained in the base tables. Materialized views that contain pre-computed summary information are referred to herein as “summary tables” or more simply, “summaries”.

Summary tables typically store aggregated information, such as “sum of PRODUCT_sales, by region, by month.” Other examples of aggregated information include counts of tally totals, minimum values, maximum values, and average calculations.

Another form of pre-computed information stored in materialized views is materialized data reflecting the rankings of rows from the base table, where the ranking may be based on values of one or more columns. The materialized view contains a column with pre-computed values reflecting rankings. Furthermore, the ranking of a row may reflect its rank relative to a particular subset of rows of the materialized view. Thus, a single materialized view may have many such subsets, where the rows of each subset are ranked relative to the rows in the same subset, and independently of the rows in the other subsets. The various ranked subsets can by generated by grouping the rows of the materialized view based on values that they have in a particular column. A group of rows with values that satisfy one or more criteria is referred to herein as a logical partition, or simply a partition.

For example, a materialized view may contain logical partitions that are formed by grouping rows according to values in the "region" column. The materialized view also contains a column RANKING. RANKING contains values representing a row's ranking within its respective partition, where the ranking is based on values in column PRODUCT_sales. One particular partition contains the rows having the value 'WEST' in region. A row in the partition with the value 1 in the column RANKING has the highest value in PRODUCT_sales relative to other rows in the partition. A materialized view having materialized data reflecting a ranking of rows from another table is referred to herein as a ranked materialized view.

Query Rewrite

Through a process known as query rewrite, a query can be optimized to recognize and use existing materialized views that could answer the query. Typically, the query rewrite optimization is transparent to the application submitting the query. That is, the rewrite operation happens automatically and does not require the application to know about the existence of materialized views, nor that a query that accesses a particular materialized view has been substituted for the original query.

Refreshing Materialized Views

As new data is periodically added to the base tables of a materialized view, the materialized view needs to be updated to reflect the new base data. When a materialized view accurately reflects all of the data currently in its base tables, the materialized view is considered to be "fresh". Otherwise, the materialized view is considered to be "stale". A stale materialized view may be recomputed by various techniques that are collectively referred to as "refresh".

Data loading and refresh of materialized views typically takes place during off-hours when the data warehouse is in a controlled period of little activity. The data loading and refresh is restricted to a time period called the refresh window during which the system can be dedicated to refresh. The refresh window is typically allowed to be no more than four to six hours. Refresh may be deferred until the end of the week or month, so that loading of additional detail data may occur much more frequently than refresh.

One approach to refreshing materialized views is referred to as the "total refresh" or "complete refresh" approach. According to the complete refresh approach, during each refresh operation, all values stored in a stale materialized view are discarded and recalculated based on all of the base data. Systems that employ the complete refresh approach have the disadvantage that the re-creation process is a relatively lengthy operation due to the size and number of tables from which the materialized data is derived. For example, when ten new rows are added to a particular base table that contains a million rows, a complete refresh operation would have to process all one million and ten rows of the base table to regenerate the materialized views derived using the base table.

The process of updating materialized data may be improved by performing an incremental refresh, where rather than generating a new set of materialized data based on calculations that use all of the base data, the materialized data is updated based on just the new base data (i.e. the changes made to the base tables subsequent to the most recent refresh operation).

Not all types of materialized views are incrementally refreshed. For example, there is no mechanism that incrementally refreshes a ranked materialized view. The primary reason for this is that when the value of a column in a row of a base table is modified, all rows against which the row has been ranked must be sorted to determine the new ranking within the partition. For example, if the column by which a row is ranked within a partition were changed, all rows in the partition would have to be sorted again to determine a new ranking.

Based on the foregoing, it is clearly desirable to provide a mechanism that incrementally refreshes ranked materialized views, and to provide a query rewrite mechanism to access such materialized views.

SUMMARY OF THE INVENTION

Techniques are provided for improving efficiency of database systems, and in particular, for refreshing materialized views maintained by database systems and rewriting queries to access the materialized views. According to an aspect of the present invention, a ranked materialized view is incrementally refreshed, and during the incremental refresh operation, rows in the partitions of the materialized view are ranked within the partitions. A partition is a group of rows with values that satisfy one or more criteria. For example, a partition is a group of rows with matching values in a set of columns in the PARTITION BY clause of the RANK function.

Incremental refresh of a ranked materialized view is performed by only examining the updates, insertions, and deletions to the base table that have occurred since the ranked materialized view was last refreshed or created. Furthermore, the ranked materialized view is refreshed in a manner that guarantees that a partition in the materialized view, which corresponds to a partition in a base table, contains rows that correspond to a threshold minimum number of top ranked rows from the corresponding partition in the base table. Thus, assuming a threshold minimum number of 100 rankings, the incremental refresh is performed in a manner that guarantees that, after the incremental refresh operation, a partition in the materialized view includes at least the 100 highest ranked rows from the corresponding partition in the base table.

Queries requesting the X top ranked rows for the corresponding partition in the base table may be rewritten to access the ranked materialized view if X is less than or equal to the minimum threshold used by the materialized view.

During an incremental refresh, the rows within a partition of a ranked materialized view may be removed, leaving the partition with a ranking count that is less than the threshold minimum number. If, after an incremental refresh, the threshold minimum number can no longer be guaranteed, then a complete refresh of the partition is performed. To forestall the need to perform a complete refresh, a ranked materialized view can be created so that its partitions have a ranking count that may be as great as another threshold number that is greater than the minimum threshold number.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram depicting a table used to illustrate an embodiment of the present invention;

FIG. 1B is a diagram depicting a materialized used to illustrate an embodiment of the present invention;

FIG. 3A is a block diagram depicting a table used to illustrate an embodiment of the present invention;

FIG. 3B is a diagram depicting the state of a materialized view at a particular stage of an incremental refresh process according to an embodiment of the present invention;

FIG. 3C is a diagram depicting the state of a materialized view at a particular stage of an incremental refresh process according to an embodiment of the present invention;

FIG. 3D is a diagram depicting the state of a materialized view at a particular stage of an incremental refresh process according to an embodiment of the present invention;

FIG. 4B-1 is a diagram depicting a log used to track changes to base tables for an incremental refresh mechanism according to an embodiment of the present invention;

FIG. 4B-2 is a diagram depicting a view according to an embodiment of the present invention;

FIG. 4C-1 is a diagram depicting a log used to track changes to base tables for an incremental refresh mechanism according to an embodiment of the present invention;

FIG. 4C-2 is a diagram depicting a view according to an embodiment of the present invention;

FIG. 5C is a diagram illustrating a query executed as part of a process for incrementing a materialized view according to an embodiment of the present invention;

FIG. 5D is a diagram illustrating a query executed as part of a process for incrementing a materialized view according to an embodiment of the present invention;

FIG. 5E is a diagram illustrating a query executed as part of a process for incrementing a materialized view according to an embodiment of the present invention.

DETAILED DESCRIPTION OF THE INVENTION

Figure 2:
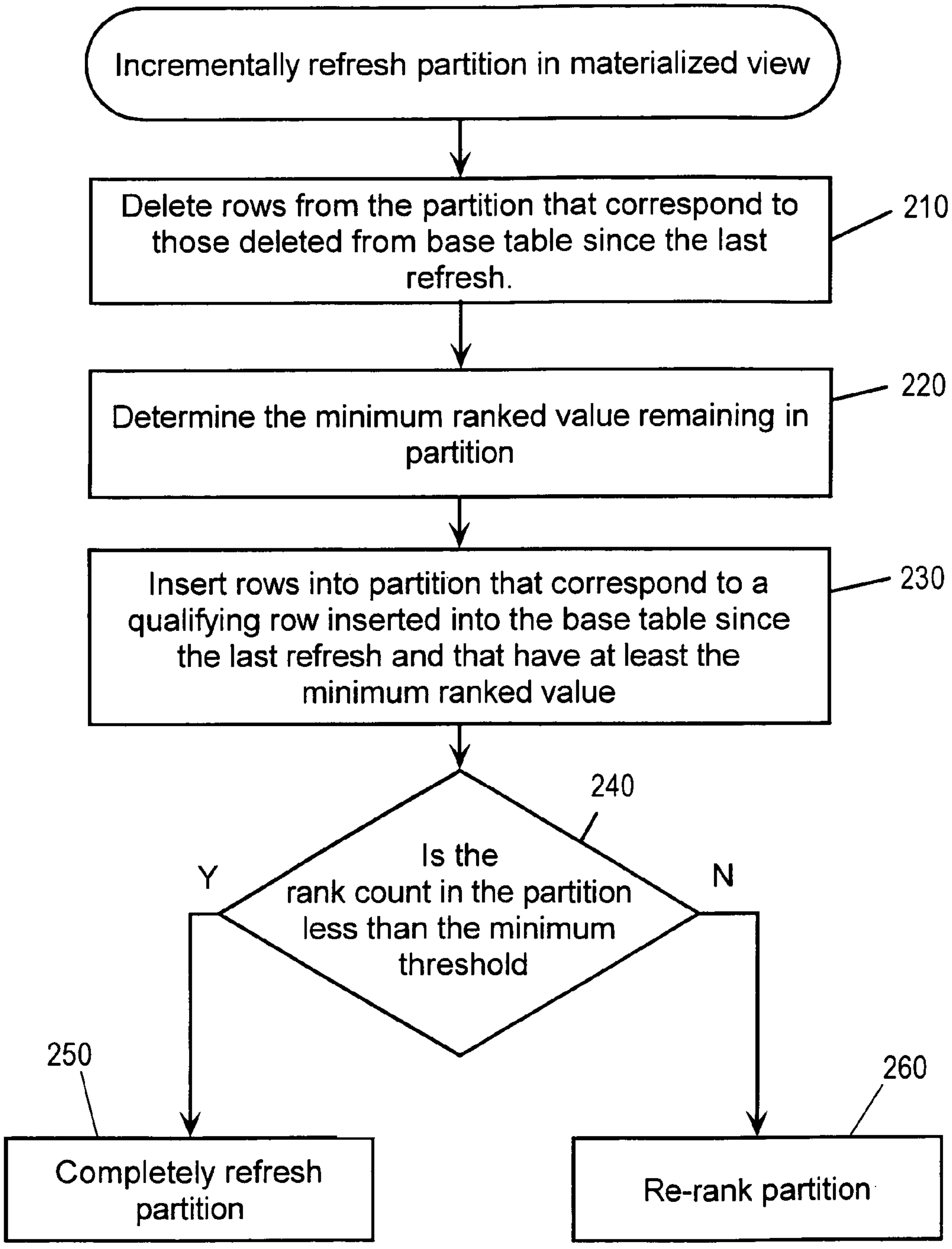
FIG. 2 is a flow chart depicting a process for incrementally refreshing a materialized view according to an embodiment of the present invention.

A method and apparatus for incrementally refreshing materialized views is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Described herein are approaches for incrementally refreshing a ranked materialized view. The approach involves creating a materialized view with rows ranked within partitions. The whole materialized view can also be viewed as a single partition, in which case the rows are globally ranked in the table. Each row in a partition of the materialized view corresponds to a row in the corresponding partition of the base table.

Incremental refresh of a ranked materialized view is performed by only examining the updates, insertions, and deletions to the base table that have occurred since the ranked materialized view was last refreshed or created. Furthermore, the ranked materialized view is refreshed in a manner that guarantees that a partition contains rows that correspond to a threshold minimum number of top ranked rows from the corresponding partition in the base table. A threshold minimum number may be, for example, 100 rankings. The number of top rankings that are represented at any given time by the rows of a partition in the materialized view is referred to herein as the ranking count of that partition. A materialized view partition that contains rows that correspond to the 100 top ranked rows from the corresponding partition in the base table has a ranking count of 100. Some rows may share the same rank, and therefore the top ranked 100 rows may include more than 100 rows. Because, for a given partition, the materialized view has a ranking count of at least the top 100 rows, queries requesting not more than the 100 top ranked rows for the corresponding partition in the base table may be rewritten to access the ranked materialized view.

During an incremental refresh, the rows within a partition of a ranked materialized view may be removed, leaving the partition with a ranking count that is less than the threshold minimum number. If, after an incremental refresh, the threshold minimum number can no longer be guaranteed, then a complete refresh is performed. To forestall the need to perform a complete refresh, a ranked materialized view can be created so that its partitions have an initial ranking count that is substantially greater than the minimum threshold number. The desired initial ranking count is referred to as the maximum threshold number.

Queries that may be rewritten to access the ranked materialized views are not limited to queries requesting ranked information. Specifically, aggregate queries that request the application of the MIN or MAX function may be rewritten to access a ranked materialized view.

Illustrative Ranked Materialized View

FIG. 1A is a diagram showing a base table and FIG. 1B is diagram showing a materialized view containing data from the base table, which are used to illustrate various embodiments of the invention. Referring to FIG. 1A, it shows table T. Table T contains columns 110 and rows 120. Columns 110 include rowid 111, region 112, sales_person 113, and sales 114. Rowid 111 is a rowid pseudo-column, which has a unique identifier for each row in a table. The rowid 111 pseudo-column may, for example, simply represent the values of the actual storage locations at which the rows are stored.

FIG. 1B shows materialized view M1, whose base table is table T. Materialized view M1 includes columns 130 and rows 140. Columns 130 include rid 131, region 132, sales_person 133, sales 134, and rnk 135. The base columns for rid 131, region 132, sales_person 133, and sales 134 are rowid 111, region 112, sales_person 113, and sales 114 respectively. rnk 135 will be explained in further detail below.

Partitions 142 and 144 are groupings of rows within materialized view M1. Partitions 142 and 144 are partitioned according to the values in region 132. Partition 142 contains rows that contain the value 'W' in the column region 132. Partition 144 is a group of rows that contain the value 'E' in column region 132.

Column rnk 135 contains ranking values. A ranking value for a particular row indicates the row's rank within a partition. A ranking may be based on an ascending or descending order of values of one or more columns. These values upon which a ranking is based are referred to as ranked values.

The rows in partitions 142 and 144 are ranked according to sales 134. For row R1 in materialized view M1, the ranking value '1' in rnk 135 indicates row R1 is ranked first within partition 142. Row R1 has the highest value in column sales 134 in partition 142. Row R3, having the lowest value in column sales 134 among the rows in partition 142, has the lowest ranking value.

The following is database command statement CM1, which specifies a definition for materialized view M1 according to an embodiment of the present invention. A database system generates metadata defining a materialized view in response to receiving a database command such as database command statement CM1.

```
CREATE MATERIALIZED VIEW M1
AS
SELECT rid, region, sales_person, sales, rnk
FROM
        ( SELECT rowid rid, region, sales_person, sales,
                RANK ( ) OVER (PARTITION BY region
                    ORDER BY sales DESC) rnk
            FROM T
    )
WHERE rnk <= r1 OR KEEP(rnk<=r2);
```

The syntax of query CM1 defines materialized view M1 as follows. The Select clause in CM1 defines materialized view M1 to have columns that correspond to base columns in table T that are returned by the inner query of CM1.

Another column defined by materialized view M1 for CM1 is rnk 135. For a particular row in M1, the value in rnk 135 is equal to the function RANK referenced in CM1. During execution of the inner query to create materialized view M1, the RANK function generates a value reflecting a rows rank in the logical partitioning defined by the window clause "(PARTITION BY region ORDER BY sales DESC)". A window clause defines a logical partition and ordering for the purpose of computing a function which in the present case is the RANK function.

The window clause is itself composed of various subclauses. The subclause "PARTITION BY REGION" is a partition-by clause that specifies the column(s) containing values, by which to partition rows, which in this case, is column region. The subclause "ORDER BY sales" is an order-by clause that specifies the column upon which to base a ranking within a partition, which in this case is column sales. The clause DESC specifies the type of ordering the ranking is based on, which in this case is the descending ordering.

The outer query includes several clauses used to establish the lower threshold number and maximum threshold number for the partitions in materialized view M1. The "KEEP (rnk<=r2)" defines the maximum threshold number to be r2. The "WHERE rnk<=r1" clause includes a predicate that defines the lower threshold number to be r1. In the particular example discussed, r1=3 and r2=6.

The syntax described for CM1 should be regarded as illustrative rather than limiting. The present invention is not limited to any particular syntax or technique for defining the attributes of a ranked materialized view, and in particular, to specifying the minimum threshold number and maximum threshold number.

Overview of Incremental Refresh Process

FIG. 2 is a flow chart showing an overview of a process for incrementally refreshing a materialized view. The steps are performed on a particular partition. The steps are illustrated using table T and partition 142 in materialized view M1. At various points during the illustration of the process for incrementally refreshing a partition, the state of partition 142 is shown in FIGS. 3B, 3C, and 3D. The process is illustrated using rows that are deleted or inserted into the base table. However, the process is applicable to materialized views based on base tables whose rows are updated, as shall be described in greater detail.

FIG. 3A shows rows in base table T that are deleted and inserted in the illustration. Rows that are deleted are lined-out. Thus rows R1 and R3 are deleted. Rows that are inserted are bordered by a dashed line. Thus rows R29 and R30 are inserted.

In illustrations that follow, a notation is used to specify column values for rows. The notation is explained according to the following example. In the phrase "R1 (W, 200)", "(W, 200)" specifies column values for row R1 in table T, denoting that the value for column region 112 is 'W' and the value for column sales 114 is 200.

In addition, a row is referred to as being qualified for a partition in a materialized view, if the row belongs to the corresponding partition in the base table. For example, row R14 (W, 80) is qualified for partition 142. Row R14 has the value 'W' for column region 112 and belongs to the partition of rows in table T that have the same value for the column region 112. R14 qualifies for partition 142 even though partition 142 contains no row that corresponds to row R14.

At step 210, rows that correspond to rows deleted from table T since the last refresh of the partition are deleted from the partition in the materialized view. In the current illustration, rows R1 (W, 200) and R3 (W, 150) in table T have been deleted. Therefore, the corresponding rows in partition 142 are deleted.

FIG. 3B shows the corresponding rows in materialized view M1 that have been deleted. The row in materialized view M1 that corresponds to a particular row in table T is the row in materialized view M1 that has the value in column rid 131 equal to the rowid of the particular row in table T. The row in materialized view M1 that corresponds to row R1 in table T is the top row shown in partition 142.

At step 220, the minimum ranked value remaining in partition 142 is determined. The minimum ranked value in partition 142 is '160'.

At step 230, rows that correspond to a qualifying row inserted into the base table since the last refresh, and that have at least the minimum ranked value in sales 114, are inserted into the partition. In the current illustration, rows R29 (W, 175) and R30 (W, 145) were added to table T. Both R29 and R30 have value 'W' in column sales 114. However, only a row for row R29 is added to partition 142 because among the pair of rows only row R29 has a value in column sales that is greater or equal to '160'.

For the rows in partition 142 that have at least the minimum ranked value in sales 134, it is possible to determine the ranking for the corresponding rows in the corresponding partition of the base table by only examining the rows in partition 142. This determination is possible because partition 142 contains two sets of rows that together represent all rows in the base table that can possibly qualify for partition 142 and that have a value of '160' or greater in sales 114. The first set includes rows that correspond to all rows in the base table that were not deleted since the last refresh, and that at the moment of the last refresh, qualify for partition 142 and have a value of '160'0 or greater in sales 114. The second subset of rows includes rows that correspond to all rows that have been inserted after the last refresh, and that have a value of '160' or greater in sales 114.

At step 240, it is determined whether the ranking count of the partition is less than the minimum threshold number. If the ranking count is less than the minimum threshold, then at step 250, a complete refresh is commenced. Otherwise at step 260, the partition is re-ranked and the ranking values in column rnk 135 are re-calculated accordingly.

In the current illustration, the minimum threshold number is 3. In partition 142, the ranking count is five. Therefore, execution of the steps proceeds to step 260, where partition 142 is re-ranked and column rnk 135 in materialized view M1 is recalculated. FIG. 3D shows partition 142 after performing step 260.

In database systems, rows may be deleted, inserted, or updated. For the purposes of incrementally refreshing a materialized view according to approaches described herein, an update of a row is treated as a deletion of the row with its old values (pre-update values) and an insertion of a row with the new column values. For example, if row R1 had been updated to have a value '100' for sales 114, the update would be processed as a delete of row R1 with value '200' for column sales 114 as described above, and an insert of row R1 with a new updated value of '100' for column sales 114.

Illustrative Implementation

Figure 4A:
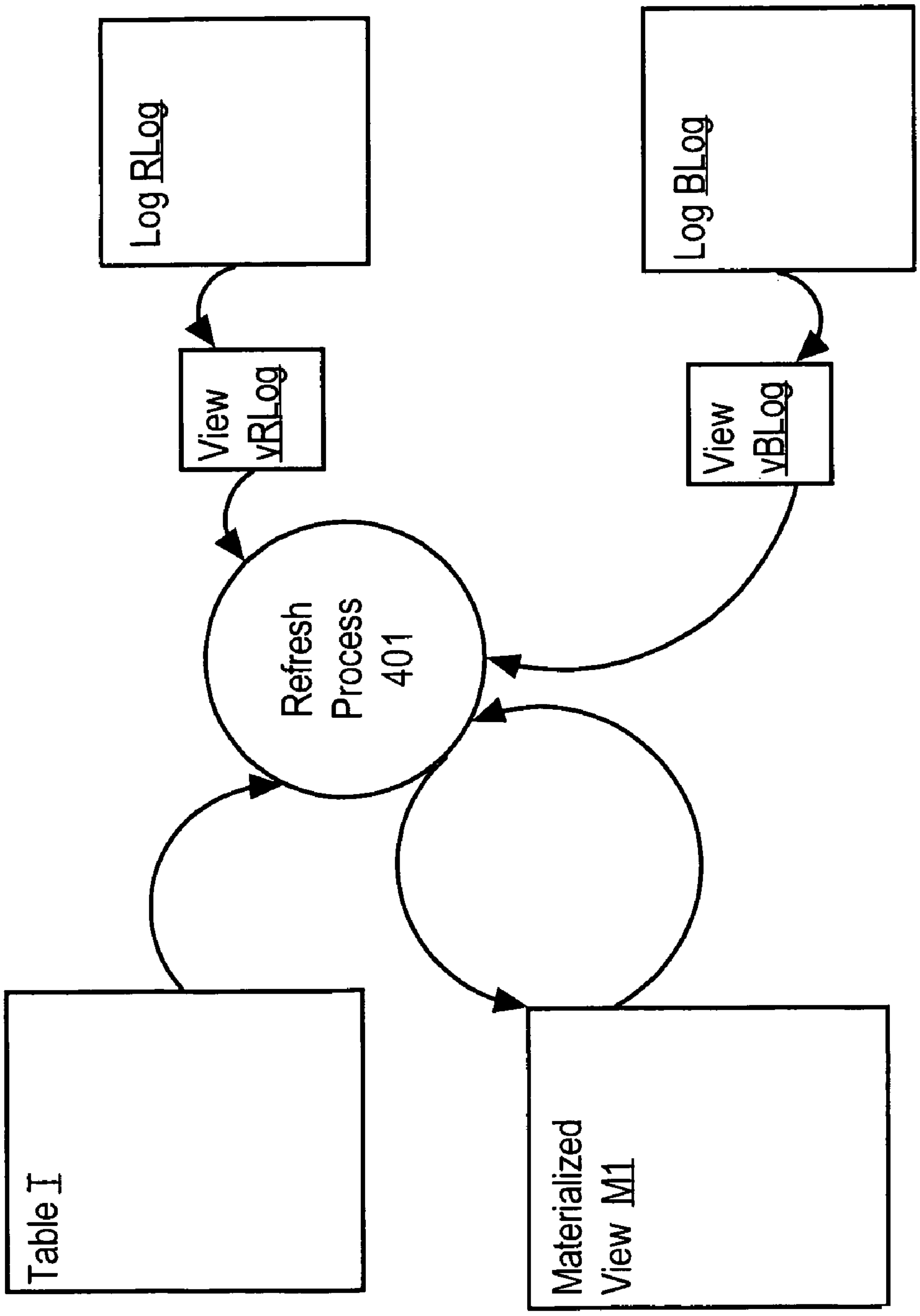
FIG. 4A is a block diagram depicting an incremental refresh mechanism according to an embodiment of the present invention.

FIG. 4A shows an incremental refresh mechanism according to an embodiment of the present invention. Referring to FIG. 4A, materialized view refresh process 401 is a computer process that both completely refreshes and incrementally refreshes a materialized view M1. The process may be invoked at periodic intervals or upon the occurrence of various events. For example, whenever a transaction is committed, where the transaction modifies the base table for the materialized view.

To incrementally refresh a ranked materialized view, information is needed about changes that have occurred to the base table between refreshes. Logs RLog and BLog are log tables that contain information recording such changes to table T. The information is extracted by materialized view refresh process 401 from log RLog through queries issued against view vRLog, and from log BLog through queries issued against view vBLog. The log tables are maintained by the database management system that manages table T.

FIGS. 4B are diagrams that depict log RLog and view vRLog in greater detail. Log RLog includes rows 440 and columns snaptime$$ 435, oldnew 436, rid 431, region 432, sales_person 433, and sales 434. Log RLog is a row-based log because its rows record changes to a particular row in a particular table, referred to herein as the master table. In this case, table T is the master table. A row in a row-based log is referred to as a log record. Column snaptime$$ 435 contains values that specify the time a change occurred.

RLog contains two types of log records. One type contains the values in rows in the master table that are deleted or updated. For this type of log record, column oldnew 436 is set to 'O'. A log record for a row that has been deleted contains the values that existed for a row when the row was deleted. A log record for a row that has been updated contains the values for the row that existed when the row was updated. For example, row 411 in FIG. 4B is a log record for an update to row R1 in table T, where the value for sales 114 is changed from '200' to '100'. Columns region 432, sales_person 433, and sales 434 contain the old values, that existed before the update, in columns region 112, sales_person 113, and sales 114 in table T. Column rid 431 contains the row-id of the row. Column snaptime$$ 435 is set to the time of update, which is t1. Oldnew is set to 'O'.

The second type of log record records information for rows in the master table that are inserted and updated. For this type of log record, column oldnew 36 is set to 'N'. A log record for a row that has been inserted contains the values to which the row's columns are set when the row is inserted. A log record for a row that has been updated, contains values for the row that existed right after the insert. In the current example for row R1 in table T, row 412 is the log record generated for the update. Columns region 432, sales_person 433, and sales 434 contain the values that existed right after the update in columns region 112, sales_person 113, and sales 114 in table T. Column rid 431 contains the row-id 111 of the row in Table T. Column snaptime$$ 435 is set to the time of the update, which is t1. oldnew is set to 'N'.

FIG. 4B-2 shows the definition of view vRLog. The WHERE clause contains predicates that specify criteria that is only satisfied by log records in log RLog that reflect changes that have occurred between the last refresh time and the current time. Values for these times are stored as variables :last_refresh_time and :current_refresh_time.

FIG. 4C-1 shows log BLog in greater detail. Log BLog records information about bulk inserts into one or more tables. A bulk insert refers to the capability of some databases to add multiple rows contained in a group of data blocks to a table in a single "bulk insert operation", by "simply" incorporating the group of datablocks as part of the set of datablocks that a database system uses to hold rows for the table. A group of datablocks that may be incorporated in this manner include, without limitation, an extent, which is composed of multiple datablocks stored contiguously in a datafile.

Log BLog contains rows 462 and columns tableobj 472, timestamp 474, lowrowid 476, and highrowid 478. Rows 462 are composed of one or more log records that each record information about a particular bulk insert operation. Column tableobj 472 contains values that identify the table to which the rows were bulk inserted. The value may be, for example, an object identifier used by a database system to identify the particular table. Column timestamp 474 contains values that specify the time the bulk insert occurred.

Rows that are bulk inserted exclusively occupy a range of row-ids. A value in column lowrowid 476 identifies the beginning of a range, column highrowid 478 identifies the end of a range.

For example, row 464 records a bulk insert into table T. The value objectid_T in column tableobj 472 identities table T, the value t2 in column timestamp 474 specifies the time of the bulk insert, the value 'R10000' in lowrowid 476 specifies the beginning of a range of row-ids, the value 'R20000' in highrowid 478 specifies the end of the range of row-ids.

FIG. 4C-2 shows the definition of view vBLog. View vBLog is a join view between Blog and table T. View vBlog returns rows from table T that have been bulk inserted between the last refresh time exclusively and the current refresh time inclusively. The rows returned from view vBLog have the same shape as the rows returned from vRLog, that is, the rows have a sequence of columns that have the same datatype and column identifier. View vBLog specifies a value 'N' for column oldnew, thus a result set for vBLog always contains 'N' in column oldnew. The result set is formed by joining rows from table T with log records in Blog that record a bulk insert to table T where the bulk insert occurred between the last refresh time exclusively and the current refresh time inclusively. The join condition is that a row in table T has a value column for rowid that lies within a row-id range specified by a log record from BLog.

Illustrative Process for Incrementally Refreshing Materialized View

Figure 5A:
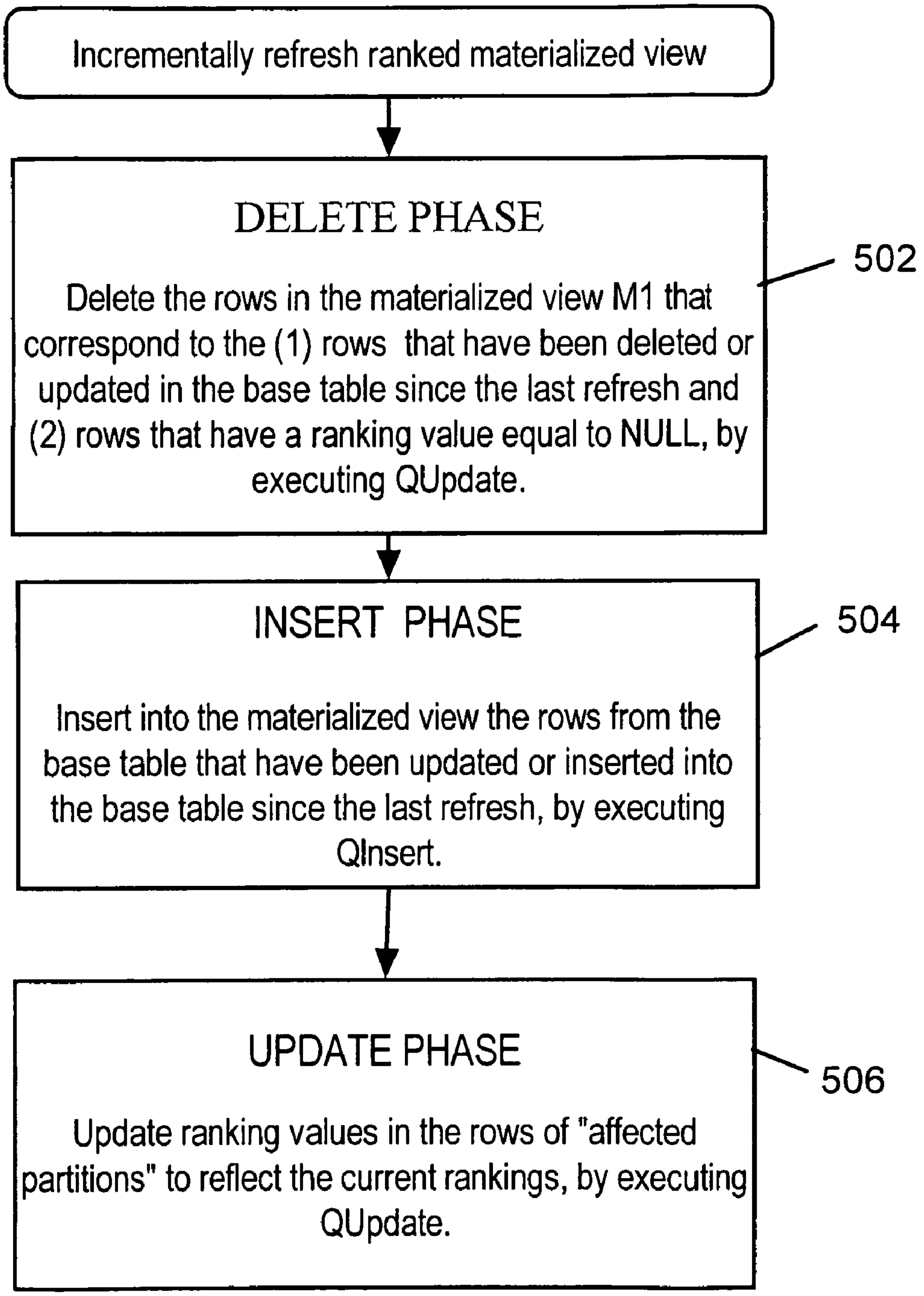
FIG. 5A is a flow chart depicting a process for incrementing a materialized view according to an embodiment of the present invention.
Figure 5B:
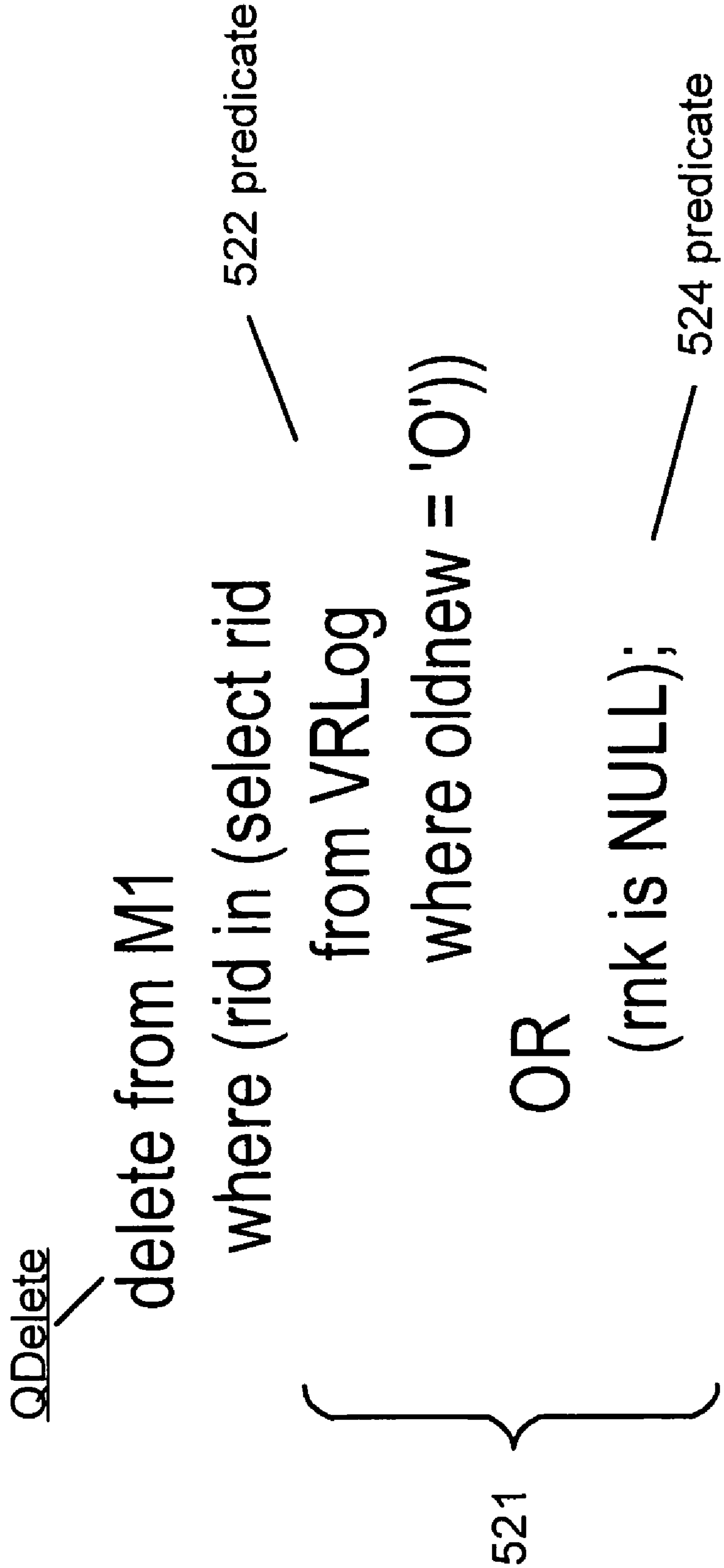
FIG. 5B is a diagram illustrating a query executed as part of a process for incrementing a materialized view according to an embodiment of the present invention.

FIG. 5A shows the three phases of a process for incrementally refreshing a materialized view according to an embodiment of the present invention. Each phase is performed by executing a single database command that substantially conforms to SQL. These phases include delete phase 502, insert phase 504, and update phase 506. FIG. 5B shows database command QDelete, which is executed for delete phase 502. FIG. 5C shows database command QInsert, which is executed for insert phase 504. FIG. 5D shows database command QUpdate, which is executed for update phase 506.

During delete phase 502, materialized view refresh process 401 deletes the rows in the materialized view M1 that correspond to (1) the rows that have been deleted or updated in the base table since the last refresh and (2) the rows in M1 where rnk 135 equals NULL. As will be explained in further detail, column rnk 135 for a given row may be set to NULL during execution of the UPDATE PHASE. A row with this value for this column is treated as being unranked and deleted in the delete phase 502 of a subsequent refresh.

Referring to FIG. 5B, database command QDelete is executed to delete the rows in materialized view M1 for delete phase 502. Where clause 521 includes predicates 522 and 524, which define criteria satisfied by the rows to delete from M1.

The criterion defined by predicate 522 is satisfied by rows in M1 having a value for column rid 131 that equals the row-id of a row in the result set of view vRLog. A subset of the result set of view vRLog with oldnew=O contains rows deleted or old values of rows updated from base table T since the last refresh.

The criterion defined by predicate 524 is satisfied by rows in M1 where column rnk 135 contains the NULL value and is included to remove rows marked as "refresh deleted" (i.e. rank=null) in the previous refresh.

During the insert phase 504, materialized view refresh process 401 inserts into materialized view M1 the rows from base table T that have been updated or inserted into base table T since the last refresh. Referring to FIG. 5C, database command QInsert is executed to perform insert phase 504. Execution of QInsert inserts into materialized view M1 rows from table T that satisfy the criteria defined by predicate 542 in where clause 540. Rows that satisfy this criteria are the rows in table T having a row-id value found in the union of several result sets, and in particular, found in column rid of a rows in the union. The union contains a row for every row inserted or updated in base table T since the last refresh.

The first of the several result sets is the result set of inner query 526. Inner query 526 references view vRLog. The rows from vRLog include the log records generated between refreshes. Of these log records, the WHERE clause predicate of inner query 526 filters those log records corresponding to inserts and log records with new values of updated rows. Thus, the first result set includes rows having a rid column that contains row-ids of rows updated and inserted in table T since the last refresh.

The second result set is defined by inner query 528. Inner query 528 references the rid column of view vBLog. The rows returned by view vBLog include rows in table T bulk inserted into table T since the last refresh. Thus, the second result set includes rows with a column rid that contains rows-ids of rows bulk inserted since the last refresh.

During update phase 506, materialized view refresh process 401 updates ranking values in column rnk 135 in the rows of "affected partitions" to reflect the current rankings. An "affected partition" is a partition containing rows whose ranking may be affected by inserts, deletes, and updates of rows in the base table since the last refresh. The rows are updated by changing ranking values in rnk 135 to reflect the new rankings within an affected partition. For rows having a value in sales 134 that is less than the minimum ranked value, the value in rnk 135 is set to NULL, which in effect, leaves the rows unranked. These rows are deleted during the delete phase 502 of the next execution of the incremental refresh process.

Referring to FIG. 5D, the update phase 506 is executed to update rows in affected partitions. The update is performed using inline view JV 562. JV 562 returns rows from the affected partitions in materialized view M1, where the rows have a ranking less than or equal to the higher threshold number 'r2'. Each row has a value for column rnk 135 and column new_rnk. The value for new_rnk is the rows' recalculated ranking value.

Inline view JV is a join between materialized view M1 and inline view V 564. The predicates 572 of inline view JV 562 filter rows from the join that have (1) values for sales 134 that are greater or equal to the minimum ranked value and (2) values for new_rnk less than or equal to maximum threshold number 'r2'.

Inline view V 564 returns rows from affected partitions in M1, the rows having columns rid 131, region 132, sales 134, min_sales, and new_rnk. Predicate 580 of inline view V 564 filters rows from M1 containing a value in region 132 found in the region column of any row from views vRLog or vBLog. In effect, predicate 580 filters rows that are in an affected partition.

Min_sales is the value of the MIN function 576, which when computed, returns the minimum value in column sales 134 found in a subset of rows in a partition of materialized view M1, where the subset contains rows having non-NULL ranking values in column rnk 135. This subset contains only rows that resided in a partition before the current incremental refresh and after execution of delete phase 502. The CASE statement in MIN function 576 limits the rows on which the minimum calculation is based to this subset.

The column new_rnk is equal to the value of RANK function 578. This function returns a ranking value based on values in sales 134 for a particular partition.

Detecting Complete Refresh Conditions

According to an embodiment of the present invention, a complete refresh of materialized view M1 is commenced when, after performing update phase 506, the ranking count of at least one partition is less than the threshold minimum number requirement. Determining whether this condition exists is an operation that may be performed by executing a separate query that generates a result indicating that at least one partition in the materialized view does not satisfy the minimum threshold requirement. In response to detecting this condition, refresh process 401 commences a complete refresh of the materialized view M1.

Alternately, a mechanism for detecting the condition may be incorporated in the database command that is executed to perform update phase 506. FIG. 5E shows a database command QUpdate', which is a modified version of database command QUpdate. Unlike QUpdate, QUpdate' includes function ASSERT 590 in the Select list of inline view JV 562. The function generates an error condition if the argument boolean condition evaluates to FALSE, i.e., the ranking count of at least one partition in M1 is less the threshold minimum number 'r1'. The error condition is detected by refresh process 401. In response to detecting the error condition, refresh process 401 commences execution of the complete refresh process in lieu of the incremental refresh process.

Caveat With NULL Values:

It is possible that a column upon which a ranking is based may be NULL. If NULLS in the column are ranked higher than non-NULL values, then the ranking values generated for a materialized view must account for this sort of ranking.

For example, sales 114 may contain NULL values. The window clause 582 in QUpdate may define an ordering where NULL values are first in order. The clause in QUpate that contains RANK function 578 and window clause 582 may be rewritten to cause partitions in M1 to reflect an ordering where non-NULL values are ranked higher as follows.

```
RANK ( ) OVER (PARTITION BY region ORDER
    BY sales DESC NULLS FIRST))
```

In addition, predicates based on sales should account for the NULL value being ranked higher than non-NULL values. For example, the predicate (sales>=min_sales) in predicates 572 can be rewritten to the following predicate PRW1.

```
(sales>=min_sales OR sales is NULL)
```

Query Rewrite

A query that requires up to a threshold minimum number of ranked values from a base table may be rewritten to access a materialized view. Before the query is rewritten, rewrite criteria should be satisfied. Rewrite criteria, includes, without limitation, (1) that the query request no more than the threshold minimum number for the materialized view, and (2) that the materialized view rank along the same column as that requested by the query. If the rewrite criteria is satisfied, then the query may be rewritten.

The following query QB1 is provided as an example to illustrate a rewrite of a query. The illustration is based on table T and materialized view M1. Assume the threshold minimum number is 'r1'=100.

```
SELECT rowid rid, region, sales_person, SALE
    RANK ( ) OVER (PARTITION BY region ORDER BY SALE
    DESC)
        rnk
FROM T
WHERE rnk <10
```

Query QB1 requests the top ten ranking rows from tables based on the columns sales 114. Because the query requests less than the threshold minimum number defined for materialized view M1, and requests a ranking based on sales, i.e., the same column used to rank rows in M1, QB1 may be rewritten to access materialized view M1. The query may be rewritten to query QB2, as follows.

```
SELECT rid, region, sales_person, SALE, rnk
FROM M1
WHERE rank < 10
```

Because base table T contains many more rows than materialized view M1, the rewritten query may be executed much more quickly, as it accesses a smaller set of data and avoids expensive sort operations, otherwise required for computation of the rank function.

Rewriting Aggregate Queries

Aggregate queries that request the application of MAX or MIN functions to groups of rows in a base table may be rewritten to access a ranked materialized view. In general, to be rewritten in this manner, the aggregate query should request application of the MIN or MAX function to the same field by which the ranked materialized view ranks rows, and should group by the same field by which the rows are partitioned in a ranked materialized partitions.

To provide an example of such a query, and to illustrate how the query may be rewritten, the following query QAG1 is provided. The illustration is based on table T and materialized view M1.

```
SELECT region, MAX(sales)
FROM T
GROUP BY region;
```

Query QAG1 requests rows representing the maximum sales per region. Specifically, query QAG1 requests that the MAX function be applied to column sales 114 for groups of rows in base table T, where the rows are grouped by column region 112. Thus, query QAG1 requests application of the MAX function (1) to the same field by which rows are ranked in materialized view M1 and (2) to groups of rows grouped by the same field by which rows are partitioned in the rank function of M1. Query QAG1 may be rewritten to query QAG2, as follows.

```
SELECT region, MAX(sales)
FROM M1
WHERE rnk = 1
GROUP BY region;
```

The group-by operator is included in QAG2 because multiple rows in M1 may have the same ranking value in column rnk 135. By including the group-by operator, the result set of query QAG2 includes only one row per group. If the order of the RANK function of query QAG1 placed NULL values before non-NULL values, and rows within a partition of M1 were ordered accordingly so that the query QAG1 could be rewritten to reference M1, then a rewritten query should not contain a predicate "rnk=1" because MAX requires the maximum non-NULL value to be returned.

To support rewrites of aggregate functions that apply the MIN and MAX function to the ranked field, two ranked materialized views should be maintained. One ranked materialized view should rank in ascending order, and the other should rank in descending order. Finally, if ranked materialized views need only support rewrite of aggregate queries that request application of the MIN and MAX function, and not to support rewrite of queries requesting ranked rows, then the minimum threshold number need only be 1. This is good for refresh because, the smaller the minimum threshold number, the longer it takes for deletes or updates to cause the number of rows in a partition to fall below this threshold. Hence, complete refresh is required less frequently.

Supporting Rankings Based on Aggregations

It is not only useful to request rows from a base table ranked by a particular column, but also to request a ranking based on aggregate information based on that field. For example, a table CALL is used to track the calls of customers. Table CALL has the following fields.

CUSTOMER_ID, NUMBER, DURATION, CALL_TIME

Each row in table CALL represents a call from a customer. For each row, column CUSTOMER_ID contains a value identifying a customer, NUMBER contains a value representing a telephone number, DURATION contains a value representing the duration of the call, and CALL_TIME contains a value representing the time the call was commenced.

In addition, the following table CUSTOMER is a dimension table for table CALL. A dimension table stores values for one or more attributes of a set of data, where the set resides in another table. Table CUSTOMER stores values for attribute REGION, each value representing a geographic region of a customer. Table CUSTOMER contains the following columns.

CUSTOMER_ID, REGION

The column CUSTOMER_ID in table CALL is a foreign key into table CUSTOMER. Useful aggregate information from table CALL includes, for example, the customers having top 100 total call duration time per region. Such information may be requested using the following query QAC1.

```
SELECT * FROM
(
    SELECT C.CUSTOMER_ID, C.region,
        RANK( ) OVER (PARTITION BY C.region
            ORDER BY SUM(CALL_TIME) DESC) rnk
    FROM CALLS, CUSTOMER C
    WHERE CALLS.CUSTOMER_ID = C.CUSTOMER_ID
    GROUP BY C.CUSTOMER_ID, C.region
)
WHERE rnk <= 100;
```

To support rewrite of aggregate queries requesting ranked aggregate information, such as query QAC1, nested materialized views may be used. A nested materialized view is a materialized view of another materialized view. In other words, a nested materialized view has as a base table another materialized view. To support rewrite of an aggregate query requesting ranked aggregate information from a table, the query may be rewritten to access a nested materialized view, where the nested materialized view contains ranked rows from another summary table that holds the aggregate information. The following materialized view definitions for materialized views NM1 and NM2 are provided to illustrate a nested materialized view that may be used to rewrite aggregate queries.

NM1

```
CREATE MATERIALIZED VIEW MV_CUST_region_CALLS
    AS
    SELECT C.CUSTOMER_ID, C.region,
        SUM(CALL_TIME) SUM_CALL_TIME,
    FROM CALLS, CUSTOMER C
    WHERE CALLS.CUSTOMER_ID = C.CUSTOMER_ID
    GROUP BY C.CUSTOMER_ID, C.region;
```

NM2

```
CREATE MATERIALIZED VIEW MV_TOP_100_CUST_region
AS
SELECT * FROM
(
    SELECT region, SUM_CALL_TIME, CUSTOMER_ID
        RANK( ) OVER (PARTITION BY region
            ORDER BY SUM_CALL_TIME DESC) rnk
    FROM MV_CUST_region_CALLS
)
WHERE rnk <= 1000 OR KEEP (rnk<=2000);
```

Materialized view NM1 contains aggregate information containing the total call duration time for each customer by region, and in particular, the sum of values in column DURATION for groups of rows grouped by CUSTOMER_ID and region.

Nested materialized view NM2 represents the customers having the top 100 total duration time by region, and in particular, rows from materialized view NM2 having at least the top 100 ranked values in SUM_CALL_TIME for each grouping of rows in NM1 grouped by column region.

Aggregate query QAC1 may be rewritten to access nested materialized view NM2 by rewriting QAC1 to the following rewritten query.

```
Select CUSTOMER_ID, region, rnk
FROM MV_TOP_100_CUST_region
Where rnk < = 100
```

Finally, materialized view NM2 may be incrementally refreshed according to the approaches described herein. A row-based log for materialized view NM1 tracks the updates, deletes, and inserts to materialized view NM1. Materialized view NM1 may be incrementally refreshed using techniques for incrementally refreshing summary tables, such as discussed in Lawande.

In general, a ranked materialized view should not include a group-by clause or a HAVING clause. The reason for this is that if rows for a group in the materialized view are changed in the base table and that particular group is not in the materialized view, then the base table would have to be examined to recompute the aggregate for the group at the time of incremental refresh. Since the base table is usually big, we want to avoid going to the base table as much as possible.

Hardware Overview

Figure 6:
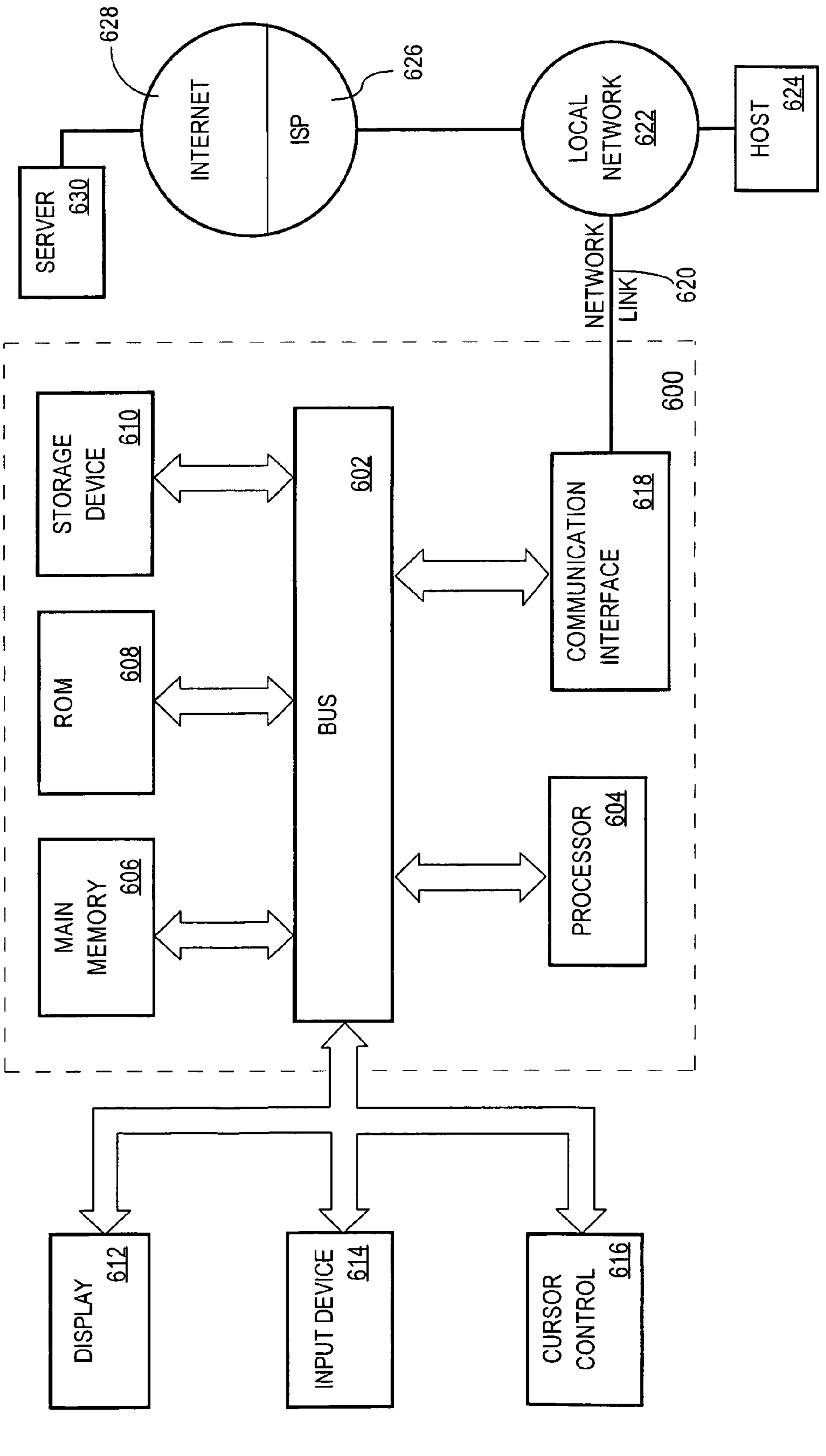
FIG. 6 is a block diagram of a computer system used to implement an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of rewriting queries, the method comprising:

a database computer system performing the steps of:

receiving a query that requests N top ranking rows from groups of rows in a base table, wherein said ranking is based on a particular ranking criteria;

query to reference a materialized view;

wherein said criteria for rewriting the query includes that:

a) the materialized view ranks rows based on said particular ranking criteria; and b) N is less than or equal to a minimum threshold number associated with the materialized view; wherein said materialized view is incrementally refreshed in a manner that guarantees that after incrementally refreshing, said materialized view contains a number of ranked rows in said groups of rows that is least as said minimum threshold number;

if said received query satisfies said one or more criteria for rewriting, then rewriting said query to produce a rewritten query that references the materialized view.

2. The method of claim 1, wherein:

said N top ranking rows are ranked based on a field in the base table; and wherein said one or more criteria include that the materialized view rank rows based on said field.

3. The method of claim 1, wherein:

said query requests N top ranking rows from groups of rows that are partitioned based on a field; and said one or more criteria include that said materialized view contains partitions of rows partitioned by field.

4. A computer-readable volatile or non-volatile medium storing one or more sequences of instructions which, when executed by one or more processors, causes the one or more processors to perform:

receiving a query that requests N top ranking rows from groups of rows in a base table, wherein said ranking is based on a particular ranking criteria;

determining whether said received query satisfies one or more criteria for rewriting the query to reference a materialized view;

wherein said criteria for rewriting the query includes that:

a) the materialized view ranks rows based on said particular ranking criteria; and b) N is less than or equal to a minimum threshold number associated with the materialized view; wherein said materialized view is incrementally refreshed in a manner that guarantees that after incrementally refreshing, said materialized view contains a number of ranked rows in said groups of rows that is least as said minimum threshold number;

if said received query satisfies said one or more criteria for rewriting, then rewriting said query to produce a rewritten query that references the materialized view.

5. A computer-readable volatile or non-volatile medium as recited in claim 4, wherein:

said N top ranking rows are ranked based on a field in the base table; and wherein said one or more criteria include that the materialized view rank rows based on said field.

6. A computer-readable volatile or non-volatile medium as recited in claim 4, wherein:

said query requests N top ranking rows from groups of rows that are partitioned based on a field; and said one or more criteria include that said materialized view contains partitions of rows partitioned on said field.

* * * * *

UNITED STATES PATENT AND TRADEMARK OFFICE

CERTIFICATE OF CORRECTION

PATENT NO. : 7,912,834 B2
APPLICATION NO. : 11/437072
DATED : March 22, 2011
INVENTOR(S) : Gupta et al.

It is certified that error appears in the above-identified patent and that said Letters Patent is hereby corrected as shown below:

On page 2, in column 2, References Cited Under Other Publications, line 68, delete “Preemptble” and insert -- Preemptible --, therefor.

On page 3, in column 1, References Cited Under Other Publications, line 17, delete “Cybernetifcs,” and insert -- Cybernetics, --, therefor.

In the specification

In column 1, line 21, delete “Apr. 9,” and insert -- Apr. 19, --, therefor.

In column 8, line 67, after “‘160’” delete “0”.

In column 13, line 13, delete “QUpate” and insert -- QUpdate --, therefor.

In the claims

In column 18, line 57, claim 1, insert -- determining whether said received query satisfies one or more criteria for rewriting the -- before “query to reference a materialized view;”.

In column 18, line 66, claim 1, insert -- at -- before “least as”.

In column 18, line 67, claim 1, insert -- great as -- before “said minimum threshold number;”.

In column 19, line 14, claim 3, delete “by field” and insert -- on said field --, therefor.

In column 20, line 9, claim 4, insert -- at -- before “least as”.

In column 20, line 10, claim 4, insert -- great as -- before “said minimum threshold number;”.

Signed and Sealed this
Sixth Day of October, 2015

Michelle K. Lee

Michelle K. Lee
*Director of the United States Patent and Trademark Office*